US006354774B1

(12) United States Patent
Haughton et al.

(10) Patent No.: US 6,354,774 B1
(45) Date of Patent: Mar. 12, 2002

(54) FORSTNER DRILL BIT

(75) Inventors: Keith Louis Haughton, Midland; Glenn Wallace Haughton, Toronto, both of (CA); Mao Sheng Yan, Changshu (CN)

(73) Assignee: The Mibro Group, Ontario (CA)

( * ) Notice: Subject to any disclaimer, the term of this patent is extended or adjusted under 35 U.S.C. 154(b) by 0 days.

(21) Appl. No.: 09/559,277

(22) Filed: Apr. 27, 2000

(51) Int. Cl.[7] .................................... B23B 51/00
(52) U.S. Cl. ........................ 408/225; 408/213; 408/227
(58) Field of Search ......................... 408/213, 223–225, 408/227–230

(56) References Cited

U.S. PATENT DOCUMENTS 5,193,951 A 3/1993 Schimke ..................... 408/225
5,975,814 A 11/1999 Pomp ......................... 408/225

*Primary Examiner*—Steven C. Bishop

(74) *Attorney, Agent, or Firm*—Nancy E. Hill; Hill & Schumacher

(57) ABSTRACT

A modified Forstner type drill bit includes a shank and a drill head. The drill head includes a center brad, first and second radial cutters, first and second following rims and first and second chip channels. The center brad defines a longitudinal direction. The first and second of radial cutters extend radially from the center brad. The first and second following rims extend circumferentially from and following from in the direction of rotation the distal end of the first and second radial cutters respectively. Each following rim is divided into a plurality of segments, each have a top portion. The top portion of the segments of each following rim are generally in the same plane. The first and second chip channels are positioned adjacent to and before in the direction of rotation the first and second radial cutters respectively. The first and second chip channels are between the one of the first and second radial cutter and the second and first following rims. The shaft extend longitudinally from the radial cutters in the longitudinal direction and from the side opposed from the center brad. In one embodiment a plurality of depressions divide each following rim into segments. In another embodiment a plurality of elongate grooves divide each following rim into segments.

27 Claims, 7 Drawing Sheets

FORSTNER DRILL BIT

FIELD OF THE INVENTION

This invention relates to drill bits for use in woodworking and in particular to Forstner type drill bits.

BACKGROUND OF THE INVENTION

Forstner type drill bits are shaft mounted drills that have a cylindrical cutting head with a pair of radial cutters that are perpendicular to the axis of the drill bit. These radial cutters allow for the drilling of flat bottomed holes. Located between the radial cutters, on the axis of the drill, is a center brad that acts to provide stability to the drill when engaged in drilling a hole. As the center brad extends longitudinally beyond the radial cutters only a short distance, perhaps only 10 percent of the diameter of the bit, and has a similarly small base, again perhaps only 10 percent of the diameter of the bit, the impression of the center brad left at the bottom of a blind hole is only small and tends not to diminish the flat bottomed aspect of the hole.

Directly leading and extending longitudinally behind each radial cutter is a chip channel that allows waste wood from the drilling operation to pass from the radial cutters to the space behind the cylindrical cutting head and then out of the so bored hole. Each chip channel has a radial width equal to the width of each radial cutter and is bounded by a trailing surface that is an extension of the radial cutter. Further the trailing surface is angled such that the radial cutter leads all other parts of the trailing surface.

Trailing behind and spaced slightly apart from each radial cutter are a spur and a following rim. Since the spur and following rim are positioned at the outer most diameter of the drill bit, the spur works to sever wood fibers that are at the diameter of the drilled hole. Each spur and following rim are set slightly outwardly longitudinally from the radial cutters such that each spur severs wood fibers and so defines a clean boundary for the drilled hole before the radial cutters uplift the wood that occurs between the spur and the center brad. The spur acts to sever wood fibers and the following rim acts as a stabilizer in the sense that it follows closely the circular groove cut in the work piece by the spur. This close following of the circular groove acts to keep the drill bit from wandering. As the inner surface of the following rim is generally conical and as the circular groove cut in the work piece is also made generally of a conical surface there is considerable tendency for the two conical surfaces to stay engaged and so there exists little tendency for the bit to wander. This engagement between the conical surfaces of the bit and work piece is sufficient to allow the bit to be used to drill a hole through the edge of a work piece wherein the center brad of the bit entirely overhangs the edge of the work piece being drilled. During this operation the sole source of stability of the bit, beyond the stability offered by the tool that is driving the bit, lies between the close engagement of the following rim surfaces and the circular groove in the work piece.

The outer surface of the following rim extends toward the shank of the bit and so forms a surface that offers additional stability to the drill bit in the drilled hole by being in close engagement with the bore of the so formed hole.

As there is a considerable amount of surface to surface contact between the drill bit and the work piece, particularly on larger sized holes, only a limited longitudinal displacement of the bit into the work piece is achieved per unit of longitudinal force applied to the bit. That is to say, the actual cutting rate into the work piece can be quite low. Further, due to the surface to surface contact, considerable heat is generated and time must be allowed between drilling operations for the drill bit to cool off as overheating of the drill bit will tend to alter the hardness and consequently shorten the life of the bit.

In an effort to improve the cutting rate of Forstner bits in general, a variation has been developed that has saw type teeth formed into the following rim. The saw teeth effectively replaces the conical inner surface of the following rim with a plurality of triangular saw tooth inner surfaces. The formation of saw teeth in the following rim of a Forstner drill can mean the reduction of more than 90 percent of the area of the conical inner surface that contacts the work piece during operation. By reducing this surface area, a greater displacement of the drill into the work piece is achieved per unit of longitudinal force applied to the drill thereby resulting in increased drilling rate and reduced friction and heat buildup experienced by the drill. However this loss of conical inner surface area can result in a considerable loss of aligning tendency that normally exists between the drill and the work piece thereby resulting in a reduced ability for the drill to form generally cylindrical holes in the work piece and reduced ability to form holes where the center brad of the drill overhangs an edge or is over a void in the work piece.

Additionally, the formation of saw teeth in the following rim of the Forstner drill bit also reduces the area of the outer surface of the following rim, but only by as little as 8 percent and as the outer surface of the drill is tapered slightly, having a smaller diameter as it progresses away from the following rim, a loss of area here does not greatly reduce the aligning tendency between the drill and the work piece.

In an additional effort to further improve the drilling performance and reduce both the resulting friction and the power requirements of saw tooth Forstner drills, flutes have been introduced. The flutes extend across the outer surface of the cylindrical cutting head from the following rim and generally downwardly away from the following rim. The flutes are angled slightly from the longitudinal direction in a forward direction such that the portion of the flute proximate to the following rim radially leads the remaining portion of the flute, further the width of the flute is approximately one half the pitch of the saw teeth of the drill. Two embodiments exist for the flutes, the first including flutes of generally parabolic shape having greatest width and depth at the following rim and extending to least width and depth at the shank edge of the cylindrical cutting head. The second embodiment includes flutes with generally parallel sides such that the flutes have constant width and depth over their entire extent. In either the parabolic or parallel sided flute case, the intersection of the flutes with the saw teeth of the drill are generally the same.

The advantage of the application of flutes to a Forstner drill that already includes saw teeth is that there is reduced friction between the drill and the formed bore by reducing the area of the outer surface of the drill that contacts the formed bore in the work piece. As saw tooth Forstner drills already have limited contact between the following rim of the drill and the work piece due to the portion of the following rim that were removed to form the saw teeth, the additional application of flutes to the outer surface of the drill does little to further reduce the area of contact between the inner conical surface of the following rim and the work piece. The disadvantage of the application of flutes to a saw tooth Forstner drill bit is that there is an increased tendency to wander. That is the drill is more likely to move sideways and thus create a hole that is not straight through the work piece.

It would be advantageous to provide a Forstner type drill bit that increases the cutting rate over a conventional Forstner drill bit but reduces the tendency to wander over the fluted saw tooth Forstner drill bit.

SUMMARY OF THE INVENTION

It has been determined that advantages can be realized by applying spaced apart depressions to the following rim of a prior art Forstner drill, where the pitch between depressions is greater than the extent of each depression. It has been further realized that such depressions can be achieved either by having the depressions extend generally perpendicularly to both the following rim and the axis of the bit and or by having the depressions extend generally perpendicularly to the following rim and parallel to the axis of the bit.

The present invention is a modified Forstner type drill bit which includes a shank and a drill head. The drill head includes a center brad, first and second radial cutters, first and second following rims and first and second chip channels. The center brad defines a longitudinal direction. The first and second of radial cutters extend radially from the center brad. The first and second following rims extend circumferentially from and following from in the direction of rotation the distal end of the first and second radial cutters respectively. Each following rim is divided into a plurality of segments, each have a top portion. The top portion of the segments of each following rim are generally in the same plane. The first and second chip channels are positioned adjacent to and before in the direction of rotation the first and second radial cutters respectively. The first and second chip channels are between the one of the first and second radial cutter and the second and first following rims. The shaft extends longitudinally from the radial cutters in the longitudinal direction and from the side opposed from the center brad. In one embodiment a plurality of depressions divide each following rim into segments. In another embodiment a plurality of elongate grooves divide each following rim into segments.

Further features of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION

Figure 1:
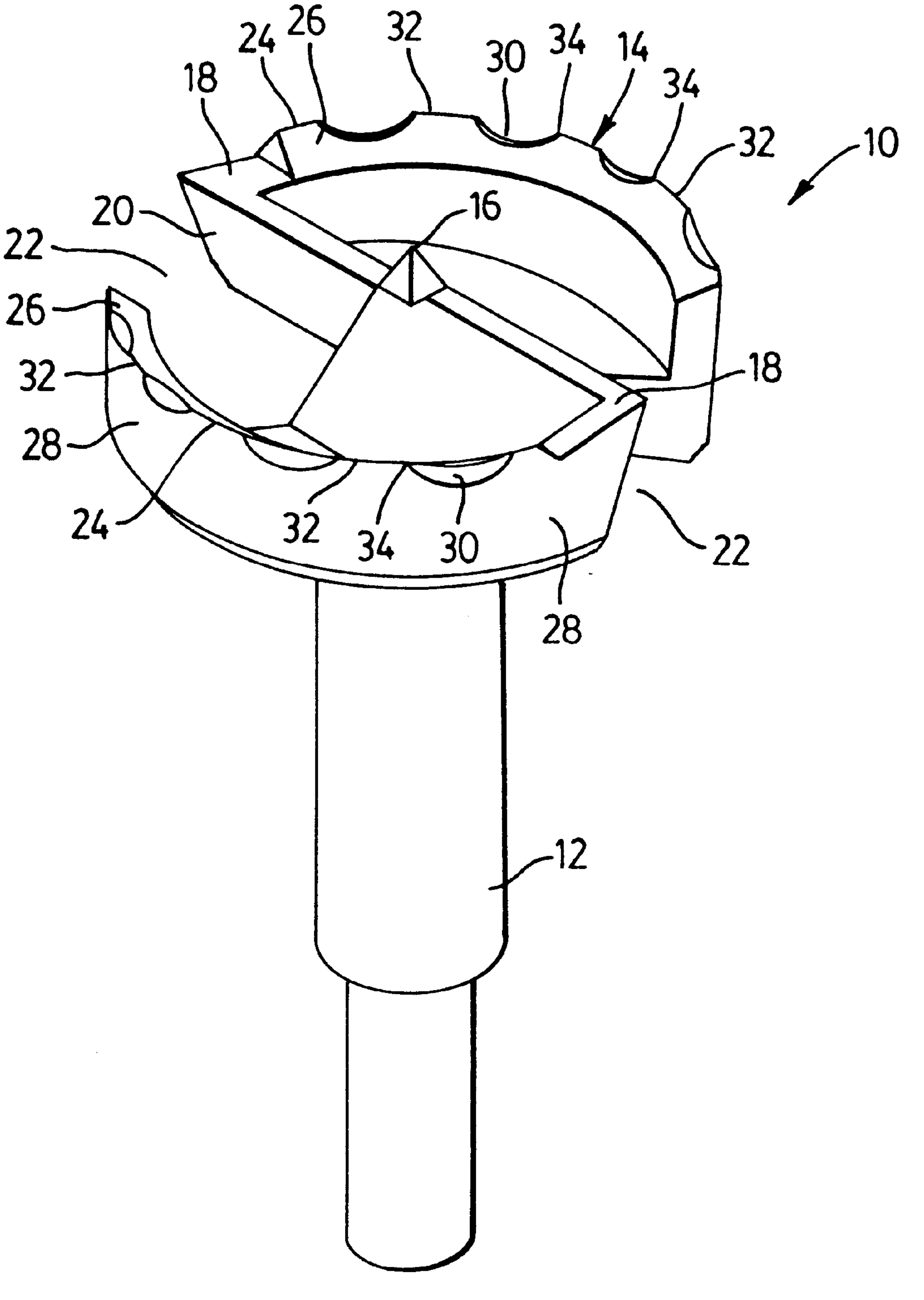
FIG. 1 is a perspective view of a drill of the present invention showing arcuate depressions.
Figure 2:
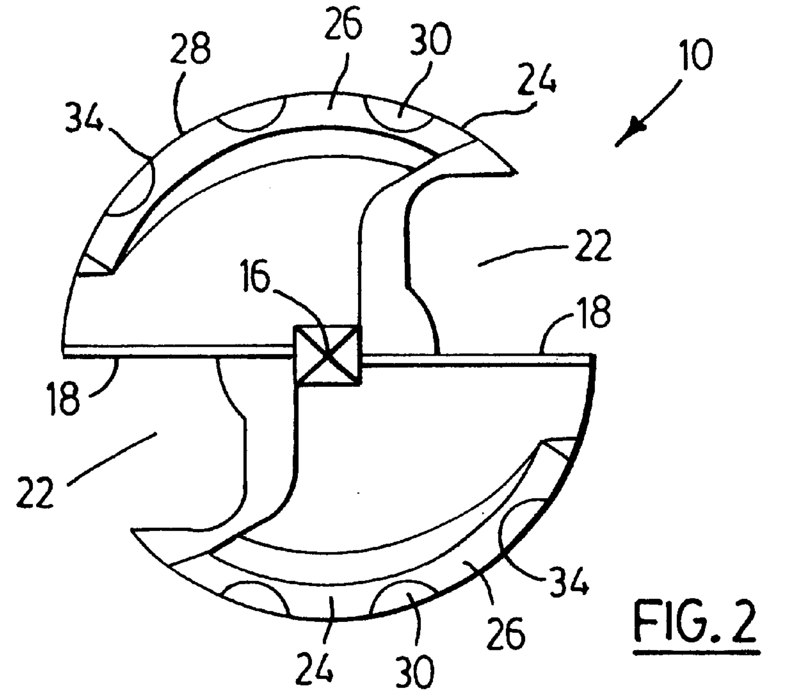
FIG. 2 is a top view of the drill of FIG. 1.
Figure 3:
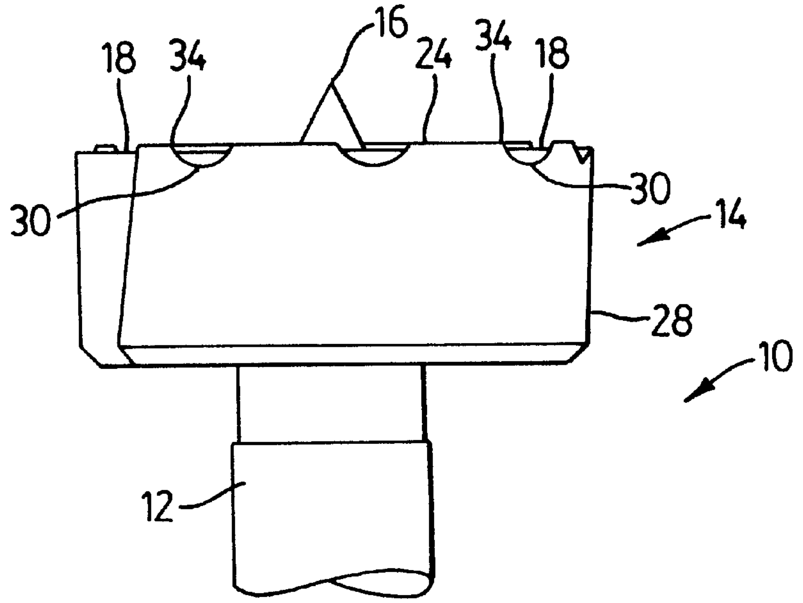
FIG. 3 is a partial side view of the drill of FIG. 1.

Referring to FIGS. 1, 2 and 3, the drill bit of the present invention is shown generally at 10 where the bit 10 has a shank 12 that extends along the axis of the drill 10 and a cutting head 14 attached to the shank 12 that is designed to drill a cylindrical bore upon rotation.

At the center of the cutting head 14 is a center brad 16 that is generally a pyramid shaped point that extends longitudinally beyond the cutting head 14. The point of the center brad 16 has the greatest longitudinal extension of all parts of the bit 10 and so, upon operation, provides stability for the bit 10 as it provides a fixed point in the work piece for the bit 10 to rotate around.

Extending radially in opposite directions from the base of the center brad 16 is a pair of radial cutters 18. The radial cutters 18 act as chisels to uplift wood on either side of the center brad 16. Extending downwardly and backwardly from the radial cutters 18 are cutter planes 20.

A chip channel 22 is positioned in front of each radial cutter 18. Each cutter plane 20 forms one side of the adjacent chip channel 22. The chip channels 22 are designed to allow for the flow and removal of dust and chips that have been cut by the radial cutters 18.

A following rim 24 extends behind each radial cutter 18 on the circumference of the drill 10. The following rim 24 has an inner conical surface 26 and an outer surface 28. The outer surface 28 extends generally longitudinally from the following rim 24.

Formed in each following rim 24 is a plurality of arcuate depressions 30 spaced apart from each other such that the pitch or distance between arcuate depressions 30 is greater than the extent or length of each arcuate depression 30. (Compare this to the saw tooth Forstner drill bit wherein the pitch and the extent are equal). Thereby there are a plurality of spaced apart segments 32, which are a portion of the following rim 24, between adjacent arcuate depressions 30. The arcuate depressions 30 are arranged on the following rim 24 so as to reduce the area of inner conical surface 26 that actually contacts the work piece during operation.

Each arcuate depression 30 extends from the inner conical surface 26 through the following rim 24 to the outer surface 28. Thus the continuity of the following rim 24 is divided into a series of segments 32 separated from each other by an arcuate depression 30. The intersection of a following portion of a arcuate depression 30, the outer surface 28, the inner conical surface 26, and a leading portion of a segmented edge 32 creates a supplementary spur 34. The supplementary spur 34 provides additional wood fiber severing capacity to the drill during operation. Generally the length of the following rim of a Forstner drill bit is approximately 57% of the circumference. The sum of the lengths of the plurality of segments 32 is in a range of 30–55% of the Forstner following rim or 15–40% of the circumference. Preferably the sum of the lengths of the plurality of segments 32 is 25% of the circumference.

As the arcuate depressions 30 extend into the inner conical surface 26 of the following rim 24, the inner conical surface 26 exhibits a series of notches that reduce the overall area of inner conical surface 26. This is particularly evident proximate to the following rim 24. The longitudinal position of each following rim 24 is between the point of the center brad 16 and radial cutter 18, as best illustrated in FIG. 3. The longitudinal position of the following rim 24 is considerably closer to radial cutter 18 than to the point of center brad 16. Generally only a small portion of the area of conical inner surface 26 actually contacts the work piece during operation. In practice it is not uncommon for the following rims 24 to be only a few hundredths of an inch longitudinally beyond the radial cutters 18. Accordingly each arcuate depression 30 need extend into the area of inner conical surface 26 only slightly to have a relatively large impact on the area of inner conical surface 26 that actually contacts the work piece during operation.

Hereinafter alternative embodiments of the invention will be described and where the element is the same as described above the same reference numeral will be used. Only those features which are different from the embodiment described above will be described in detail.

Figure 4:
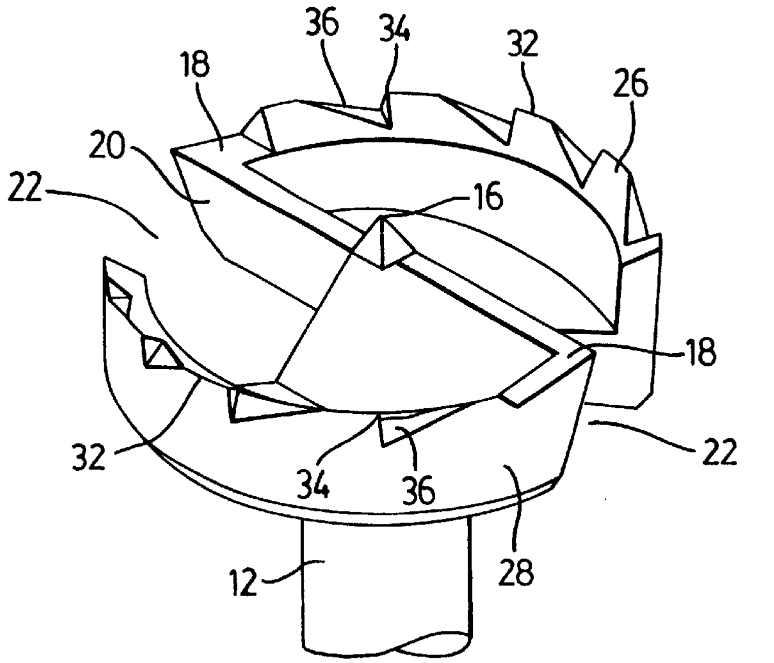
FIG. 4 is a partial perspective view of an alternate embodiment of the drill of the present invention showing "V" shaped depressions.

An alternate embodiment is shown in FIG. 4 wherein the depression is a generally "V" shaped depression 36. The spacing and depth of "V" shaped depression 36 is similar to those of arcuate depression 30.

Figure 5:
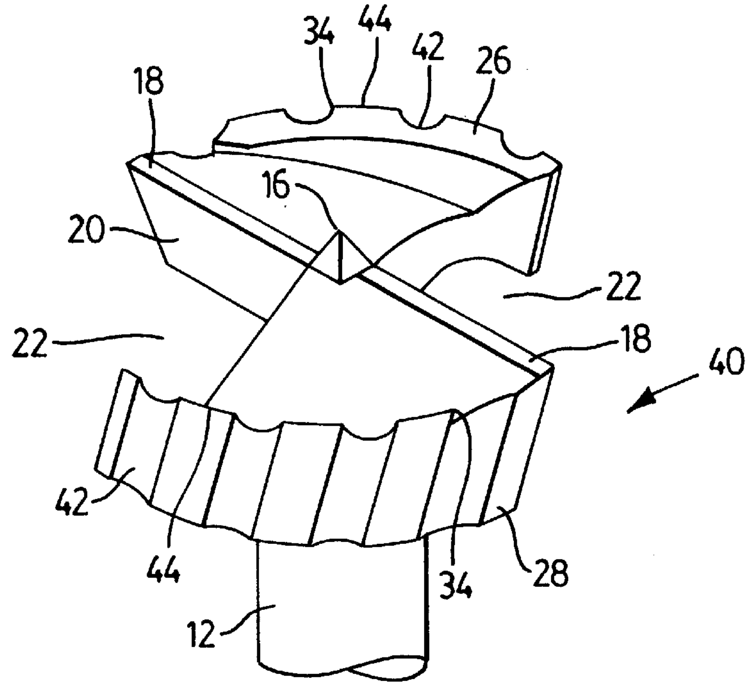
FIG. 5 is a partial perspective view of an alternate embodiment of the drill of the present invention showing alternate elongate depressions.
Figure 6:
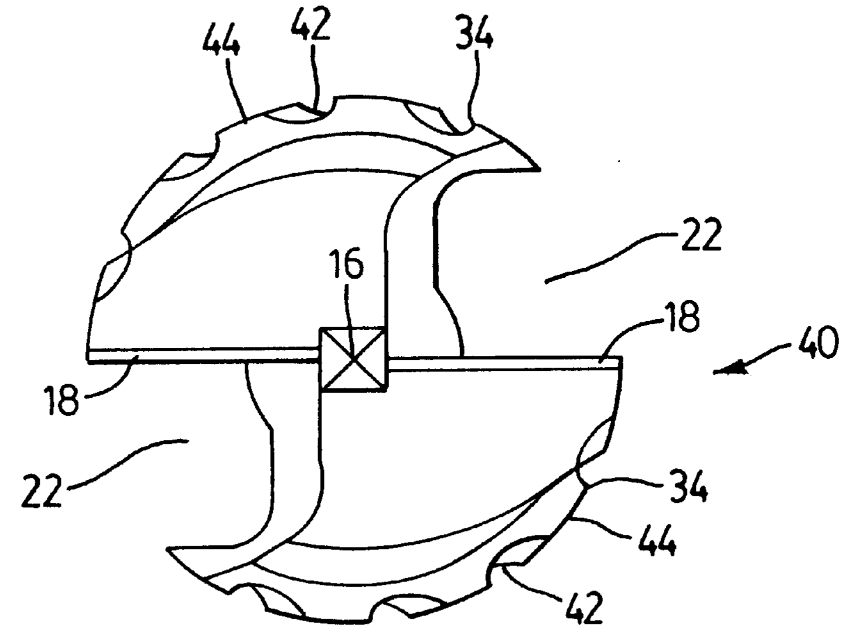
FIG. 6 is a top view of the drill of FIG. 5.
Figure 7:
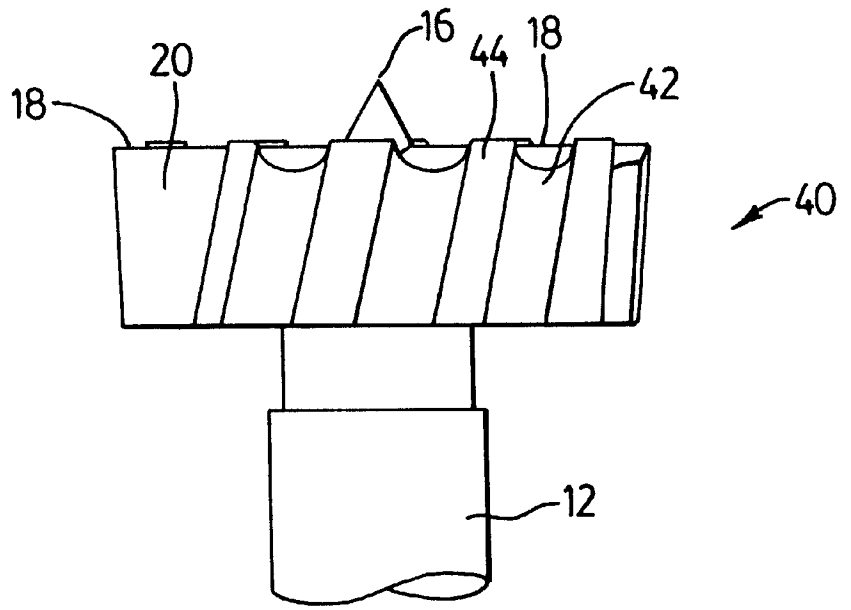
FIG. 7 is a partial side view of the drill of FIG. 5.

FIGS. 5, 6 and 7 show an alternate embodiment of the drill bit of the present invention shown generally at 40 wherein elongate grooves 42 are formed in both the following rim 24 and the outer surface 28. The elongate grooves 42 are generally in the form of flutes which extend from the following rim 24 to the opposite edge of the outer surface 28. The elongate grooves are angled in the direction of rotation as best illustrated in FIG. 7. Thus, the portion of each groove 42 proximate to the following rim 24 leads all other portions of the elongate groove 42.

The ends of elongate grooves 42 proximate to the following rim 24 divide the following rim 24 into a plurality of segments 44 similar to those segments 32 described above with regard to bit 10. The elongate grooves 42 intersect the inner conical surface 26 thus decreasing the area of the conical surface 26. As discussed above in regard to drill bit 10, similarly in regard to drill bit 40 the longitudinal position of each following rim 24 is between the point of the center brad 16 and radial cutter 18, as best illustrated in FIG. 7. The longitudinal position of the following rim 24 is considerably closer to radial cutter 18 than to the point of center brad 16. Generally only a small portion of the area of conical inner surface 26 actually contacts the work piece during operation. In practice it is not uncommon for the following rims 24 to be only a few hundredths of an inch longitudinally beyond the radial cutters 18. Accordingly each elongate groove 42 need extend into the area of inner conical surface 26 only slightly to have a relatively large impact on the area of inner conical surface 26 that actually contacts the work piece during operation.

Similarly the formation of elongate grooves 42 in outer surface 28 and the inner conical surface 26 creates supplementary spurs 34 at the leading end of each segment of following rim 24. Each supplementary spur 34 provides additional wood fiber severing capacity to the drill during operation.

Each elongate groove 42 is adjacent to a supplementary spur 34. Each elongate groove 42 provides a path for the removal of wood dust and chips cut by the supplementary spurs 34. Thus the elongate grooves minimize the accumulation of wood dust and chips thereby allowing the supplementary spur 34 to have the opportunity to cut further without being clogged with dust or chips.

Figure 8:
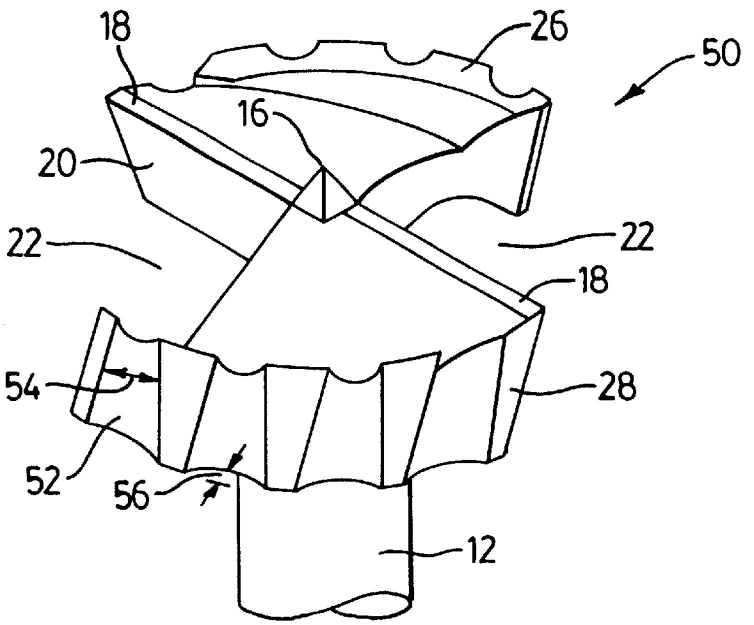
FIG. 8 is a partial perspective view of an alternate embodiment of the drill of the present invention showing progressive elongate depressions.

Referring to FIG. 8 an alternate embodiment of the drill bit of the present invention is shown generally at 50 wherein the shape of the progressive elongate groove 52 is varied. The progressive elongate groove 52 has a width 54 that increases as the distance from the following rim 24 increases and a depth 56 that increases as the distance from the following rim 24 increases. The progressive elongate grooves 52 have shape and extent proximate to the following rim 24 similar to the shape and extent of arcuate depressions 30 and elongate grooves 42 of drill bits 10 and 40 respectively.

Figure 9:
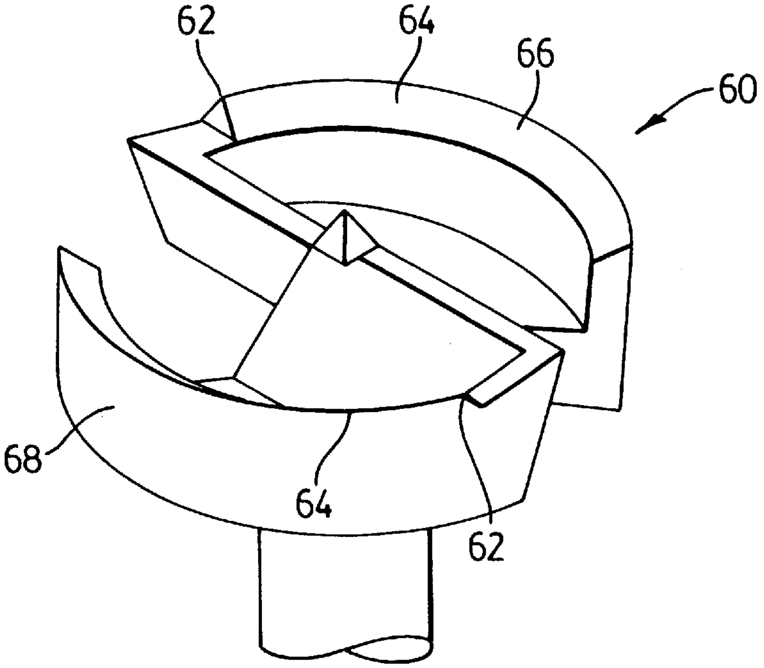
FIG. 9 (PRIOR ART)
FIG. 9 is a partial perspective view of a prior art Forstner drill.

Prior art Forstner drill bit 60, as shown in FIG. 9, has a pair of spur cutters 62 and following rims 64. The purpose of the spur cutters 62 is to sever wood fibers that occur at the perimeter of the drilled hole and the purpose of following rims 64 is to provide aligning stability between the groove cut in the work piece by the spur cutter 62 and the bit 60.

As the inner surfaces 66 of following rims 64 are generally conical and the outer surfaces 68 are generally cylindrical, there develops considerable aligning tendency between the following rim 64 and the groove cut in the work piece during operation of the drill 60. However, as there exists considerable surface to surface contact between inner surface 66, outer surface 68 and the circular groove cut in the work piece, considerable heat is generated due to friction between these surfaces. Further, only limited displacement is achieved by the drill per unit of longitudinal force applied to the drill, so it remains an object of the drill of the present invention to reduce the surface to surface contact between the drill and the work piece, to reduce friction and increase the cutting rate over conventional Forstner drills.

Figure 10:
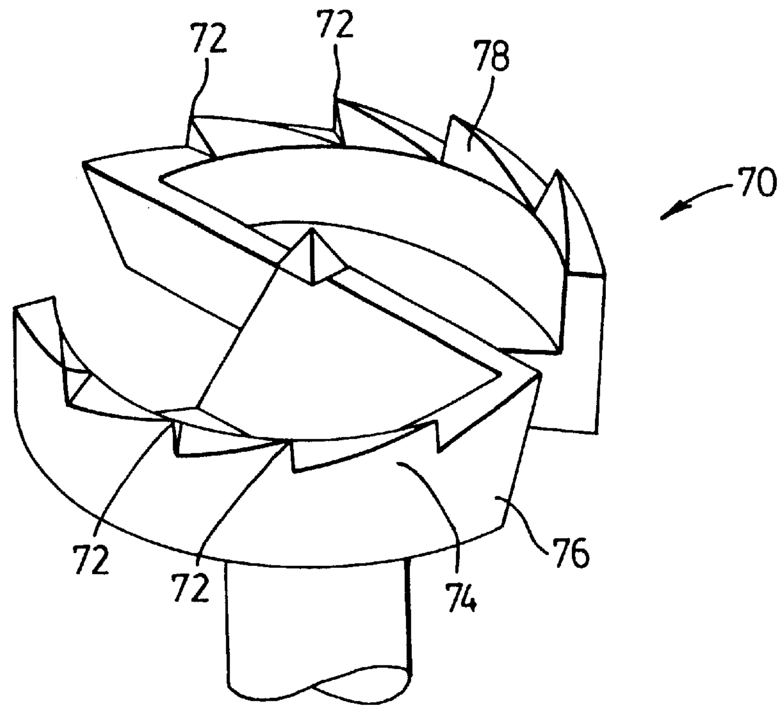
FIG. 10 (PRIOR ART)
FIG. 10 is a partial perspective view of a prior art saw tooth drill.

Alternatively, referring to FIG. 10, a prior art saw tooth Forstner drill 70 is shown with saw teeth 72 formed into its following rims 74. The object of saw teeth 72 is to provide additional cutters, as spur cutters 62 did for prior art bit 60 and to reduce the amount of friction between the following rim 74 and the work piece by having reduced the area of the following rim 74.

In greater detail, the reductions to the area of following rims 74 also reduced the areas of both the outer surface 76 and the inner conical surface 78. As outer surface 76 is tapered slightly such that the drill 70 has a decreasing diameter as it progresses away from the following rim 74, the application of saw teeth 72 has only a limited effect on reducing the area of outer surface 76 that actually bears on the inner surface of the drilled hole. The application of saw teeth 72 does not greatly reduce drag between the outer surface 76 of the drill bit 70 and the drilled hole during operation. The application of saw teeth 72 to the following rim 74 does however have a greater influence on the effective area of inner conical surface 78. As with Forstner drills 60, the following rims 74 are at a longitudinal position that leads the radial cutters often by only a few hundredths of an inch (that is, less than a millimeter). A small margin of inner conical surface 78 actually bears on the circular groove cut in the work piece during operation and thus by forming saw teeth 72 in following rim 74 a considerable portion of that margin is removed. By reducing the area of inner conical surface 78 that bears on the work piece during operation an increased drilling rate is achieved, but at a cost of greatly reducing the engaging and aligning tendencies that exist between the inner conical surface 78 and the circular groove in the work piece, as in the case of a Forstner drill.

Figure 11:
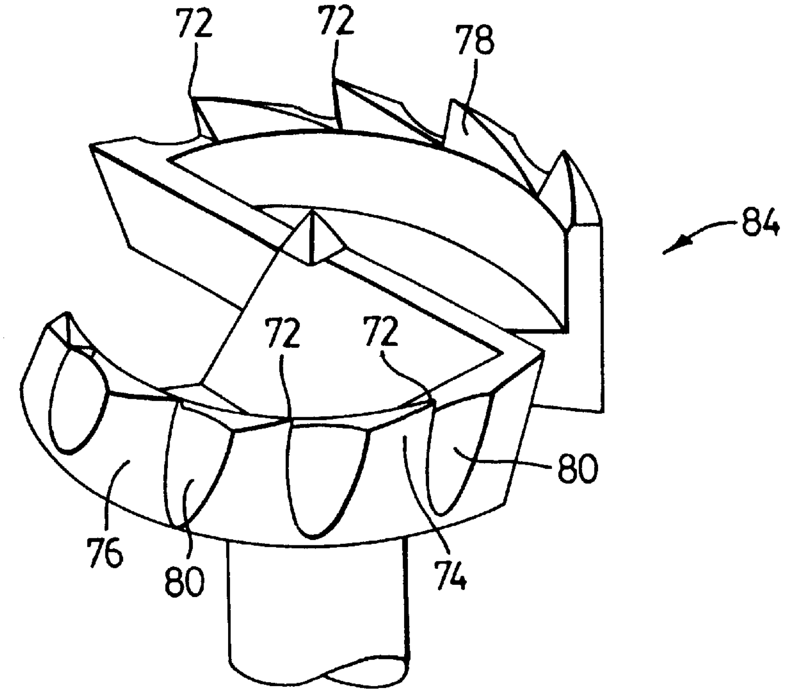
FIG. 11 (PRIOR ART)
FIG. 11 is a partial perspective view of another prior art saw tooth drill with parabolic flutes and FIG. 12 is a partial perspective view of another prior art saw tooth drill with parallel sided flutes.
Figure 12:
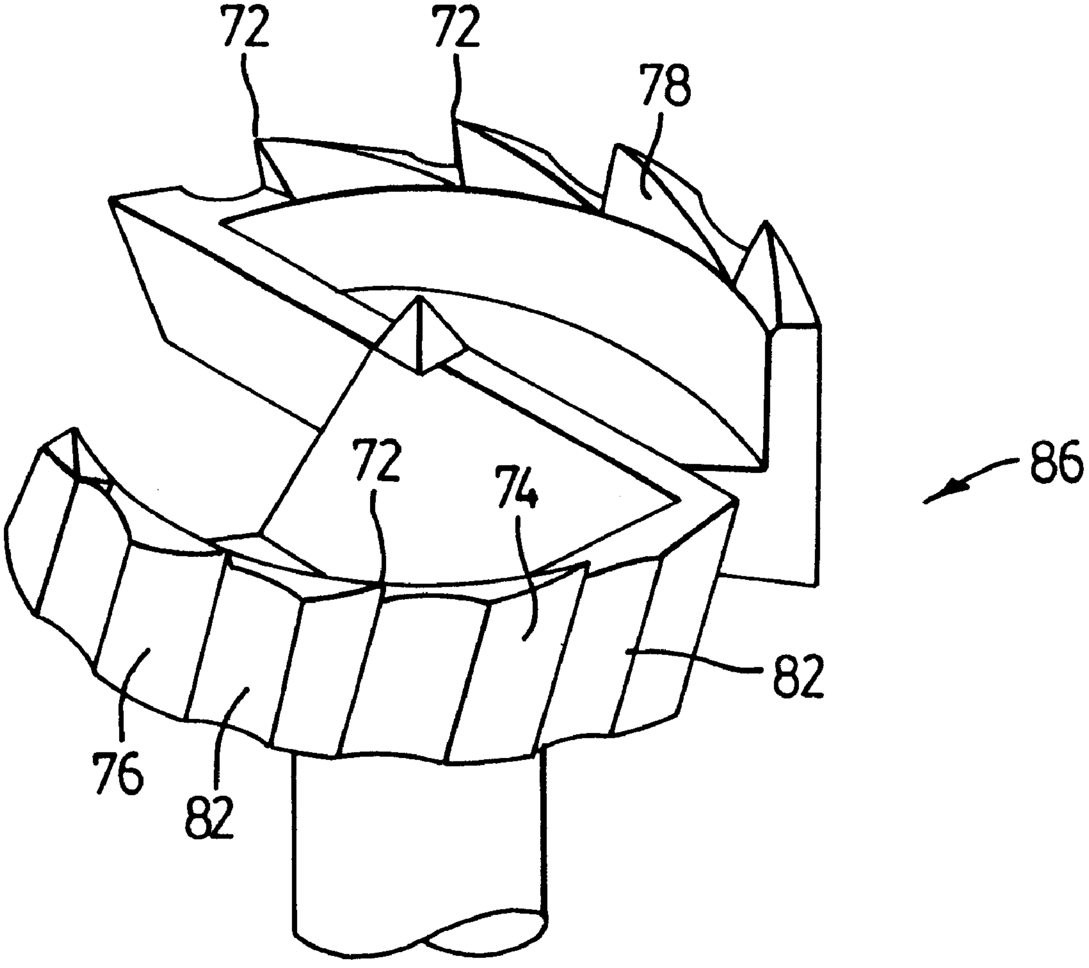
FIG. 12 (PRIOR ART)

Further embodiments of the saw tooth drill are illustrated in FIGS. 11 and 12 wherein parabolic flutes 80 or parallel sided flutes 82 are formed into the outer surfaces 76 of the drill bits 84 and 86. The object of both parabolic flutes 80 and parallel sided flutes 82 are to further reduce the area of outer surface 76 of the drill bits 84 and 86, beyond the reductions achieved by the provision of saw teeth 72. The surface area reductions due to the employment of flutes 80 and 82 are achieved solely on the outer surfaces 76 of the drills 84 and 86. As the surface area of the inner conical surfaces 78 of the drill bits 84 and 86 have already been reduced, in the areas proximate to the flutes 80 and 82, by the formation of saw teeth 72, no further reduction of this inner conical surface 78 area is achieved by the additional application of the flutes 80 and 82.

As described above there are a number of limitations in the prior art drill bits, examples of which are shown in FIGS. 10, 11 and 12. The modified Frostner drill bit of the present invention achieves an increased work rate without greatly increasing the wandering of the drill bit during use.

Application of spaced apart depressions to the following rim of a Forstner drill bit as described herein with regard to the present invention yields a segmented following rim with reduced following rim outer surface area, reduced following rim inner conical surface area and creates supplementary spur edges. As the following rim is modified only at the areas where a depression exists, the remaining portion of the following rim is unmodified and continues to act in its intended work piece engaging manner wherein the remaining outer and inner surfaces of the following rim closely engage the work piece, thus offering reduced wandering of the drill over saw tooth and fluted saw tooth drills during operation. As the modified and segmented following rim of the drill of the present invention has the reduced surface areas and supplementary spur edges, an improved rate of drilling is realized over the prior art Forstner drills. As the depressions are applied to an otherwise prior art Forstner drill, the geometry of the drill of the present invention is achieved without the effort and expense incurred to machine or otherwise form the actual saw teeth into the drill.

As a result of having applied depressions to the following rim of an otherwise prior art Forstner drill bit, a hybrid Forstner drill bit is created that exhibits improved cutting speed over Forstner drills and improved wander resistance and reduced cost over saw tooth and fluted saw tooth Forstner drill bits.

It will be appreciated that the above description related to the invention by way of example only. Many variations on the invention will be obvious to those skilled in the art and such obvious variations are within the scope of the invention as described herein whether or not expressly described.

What is claimed as the invention is:

1. A Forstner type drill bit comprising:

a center brad defining a longitudinal direction;

first and second radial cutters each extending radially from the center brad;

first and second following rims extending circumferentially from and following from in the direction of rotation the distal end of the first and second radial cutters respectively wherein each following rim is divided into a plurality of spaced apart segments each having a top portion and the top portions of the segments of each following rim are generally in the same plane wherein the length of the space between segments is less than the length of the top portion of each segment;

first and second chip channels positioned adjacent to and in front of in the direction of rotation to the first and second radial cutters respectively, and between one of the first and second radial cutters and the second and first following rims; and a shaft extending longitudinally from the radial cutters in the longitudinal direction and from the side opposed from the center brad.

2. A Forstner type drill bit as claimed in claim 1 further including a plurality of depressions spaced around each following rim and wherein the depressions separate the segments.

3. A Forstner type drill bit as claimed in claim 1 wherein each segment has a leading edge and each leading edge is formed to meet at a point and form a supplementary spur.

4. A Forstner type drill bit as claimed in claim 2 wherein each depression has a generally arcuate shape.

5. A Forstner type drill bit as claimed in claim 2 wherein each depression has an axis which is generally radial to the longitudinal direction.

6. A Forstner type drill bit as claimed in claim 2 wherein the depression has a generally "V" shape.

7. A Forstner type drill bit as claimed in claim 1 wherein the first and second following rim define a circumference and the sum of the lengths of the plurality of segments is in a range of 15 to 40 per cent of the circumference.

8. A Forstner type drill bit as claimed in claim 7 wherein the sum of the length of the plurality of segments is 25 per cent of the circumference.

9. A Forstner type drill bit as claimed in claim 1 wherein each following rim has an outer surface and an inner surface and further including a plurality of elongate grooves extending downwardly along the outer surface from the following rim and wherein the grooves separate the segments.

10. A Forstner type drill bit as claimed in claim 9 wherein each segment has a leading edge and each leading edge is formed to meet at a point and form a supplementary spur.

11. A Forstner type drill bit as claimed in claim 9 wherein each elongate groove has a pair of generally parallel sides.

12. A Forstner type drill bit as claimed in claim 11 wherein each elongate groove is angled in the direction of rotation.

13. A Forstner type drill bit as claimed in claim 9 wherein the inner surface is conical having an upper portion proximate to the following rim and the upper portion of the conical surface is divided into segments which are in registration with the segments of the following rim.

14. A Forstner type drill bit as claimed in claim 1 wherein each following rim has a conical inner surface having an upper portion proximate to the following rim and the upper portion of the conical inner surface is divided into segments which are in registration with the segments of the following rim.

15. A Forstner type drill bit as claimed in claim 9 wherein the first and second following rims define a circumference and the sum of the length of the plurality of segments is in a range of 15 to 40 per cent of the circumference.

16. A Forstner type drill bit as claimed in claim 15 wherein the sum of the length of the plurality of segments is 25 per cent of the circumference.

17. A Forstner type drill bit comprising:

a center brad defining a longitudinal direction;

first and second radial cutters each extending radially from the center brad;

first and second following rims extending circumferentially from and following from in the direction of rotation the distal end of the first and second radial cutters respectively wherein each following rim is divided into a plurality of spaced apart segments each having a top portion, the top portions of the segments of each following rim are generally in the same plane, each following rim has an outer surface and an inner surface, a plurality of elongate grooves extend downwardly along the outer surface from the following rim and separate the segments and the width of each groove increases as the distance from the following rim increases;

first and second chip channels positioned adjacent to and in front of in the direction of rotation to the first and second radial cutters respectively, and between one of the first and second radial cutters and the second and first following rims; and a shaft extending longitudinally from the radial cutters in the longitudinal direction and from the side opposed from the center brad.

18. A Forstner type drill bit comprising:

a center brad defining a longitudinal direction;

first and second radial cutters each extending radially from the center brad;

first and second following rims extending circumferentially from and following from in the direction of rotation the distal end of the first and second radial cutters respectively, each following rim being divided into a plurality of spaced apart segments each having a top portion and the top portions of the segments of each following rim are generally in the same plane and each following rim having a generally smooth outer surface extending longitudinally therefrom;

first and second chip channels positioned adjacent to and in front of in the direction of rotation to the first and second radial cutters respectively, and between one of the first and second radial cutters and the second and first following rims; and a shaft extending longitudinally from the radial cutters in the longitudinal direction and from the side opposed from the center brad.

19. A Forstner type drill bit as claimed in claim 18 further including a plurality of depressions spaced around each following rim and wherein the depressions separate the segments.

20. A Forstner type drill bit as claimed in claim 18 wherein each segment has a leading edge and each leading edge is formed to meet at a point and form a supplementary spur.

21. A Forstner type drill bit as claimed in claim 18 wherein the length of the space between segments is less than the length of the top portion of each segment.

22. A Forstner type drill bit as claimed in claim 19 wherein each depression has a generally arcuate shape.

23. A Forstner type drill bit as claimed in claim 19 wherein each depression has an axis which is generally radial to the longitudinal direction.

24. A Forstner type drill bit as claimed in claim 19 wherein the depression has a generally "V" shape.

25. A Forstner type drill bit as claimed in claim 18 wherein the first and second following rim define a circumference and the sum of the lengths of the plurality of segments is in a range of 15 to 40 per cent of the circumference.

26. A Forstner type drill bit as claimed in claim 25 wherein the sum of the length of the plurality of segments is 25 per cent of the circumference.

27. A Forstner type drill bit as claimed in claim 18 wherein each following rim has a conical inner surface having an upper portion proximate to the following rim and the upper portion of the conical inner surface is divided into segments which are in registration with the segments of the following rim.

* * * * *